US006827189B2

(12) United States Patent
Schneider et al.

(10) Patent No.: US 6,827,189 B2
(45) Date of Patent: Dec. 7, 2004

(54) ELECTROMAGNETICALLY ACTUATED, SINGLE-SURFACE FRICTION COUPLING, WITHOUT A ROTOR SLIP RING

(75) Inventors: Rudolf Schneider, Meckenbeuren (DE); Helmut Fronius, Immenstaad (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 10/362,535

(22) PCT Filed: Jul. 14, 2001

(86) PCT No.: PCT/EP01/08141

§ 371 (c)(1),
(2), (4) Date: Feb. 21, 2003

(87) PCT Pub. No.: WO02/08627

PCT Pub. Date: Jan. 31, 2002

(65) Prior Publication Data

US 2004/0104095 A1 Jun. 3, 2004

(30) Foreign Application Priority Data

Jul. 20, 2000 (DE) .......................................... 100 35 277
Jul. 20, 2000 (DE) .......................................... 100 35 276

(51) Int. Cl.⁷ ............................................. F16D 27/112
(52) U.S. Cl. .................................. 192/18 B; 192/84.96
(58) Field of Search ............................ 192/18 B, 84.96; 173/104, 213

(56) References Cited

U.S. PATENT DOCUMENTS

| 2,490,044 A | * | 12/1949 | Garbarini et al. ......... 192/84.96 |
| 3,036,679 A | | 5/1962 | Millington et al. ........... 192/84 |
| 3,415,347 A | | 12/1968 | Wrensch ...................... 192/84 |
| 3,994,379 A | * | 11/1976 | Miller et al. ............. 192/111 A |
| 4,126,215 A | * | 11/1978 | Puro ...................... 192/84.961 |
| 4,285,421 A | | 8/1981 | Halsted ..................... 192/84 C |
| 4,776,406 A | | 10/1988 | Wanner ....................... 173/18 |
| 5,285,882 A | | 2/1994 | Pardee ..................... 192/84 C |
| 6,705,410 B2 | * | 3/2004 | Ziegler ....................... 173/178 |

FOREIGN PATENT DOCUMENTS

| DE | 1 804 157 | 1/1960 | |
| DE | 1 913 883 | 10/1970 | .......... F16D/59/02 |
| DE | 40 19 493 A1 | 1/1991 | .......... F16H/55/56 |
| DE | 299 07 942 U1 | 9/1999 | .......... F16D/27/10 |
| DE | 38 23 387 C2 | 11/2000 | .......... F16D/48/06 |
| DE | 199 51 630 A1 | 6/2001 | .......... F16D/27/10 |
| FR | 1558574 | 2/1969 | |
| GB | 2 221 969 A | 2/1990 | .......... B60K/41/02 |
| JP | 62-9032 A | 1/1987 | .......... F16D/27/10 |
| JP | 08145096 A | 6/1996 | .......... F16D/67/06 |

* cited by examiner

Primary Examiner—Richard M. Lorence
(74) Attorney, Agent, or Firm—Davis & Bujold, P.L.L.C.

(57) ABSTRACT

The invention proposes an electromagnetically actuated, single-surface friction coupling without a rotor slip-ring, having a rotor element (2), a fixed magnet body (6) and a pot-shaped armature element (28) mounted so that it can be displaced axially. A cylindrical jacket shaped area (28B) of the armature element (28) extends with a narrow air gap along an outer jacket surface (12) of the magnet body (6). Between the armature element (28) and a friction surface (30) of the rotor element there is a working air gap (S) that can be bridged. To keep the moment of inertia on the drive output side as small as possible, it is proposed to arrange the rotor element (2) on the drive output side and the armature element (28) on the drive input side.

12 Claims, 1 Drawing Sheet

ELECTROMAGNETICALLY ACTUATED, SINGLE-SURFACE FRICTION COUPLING, WITHOUT A ROTOR SLIP RING

FIELD OF THE INVENTION

The invention concerns an electromagnetically actuated, single-surface friction coupling without a rotor slip-ring, having a pot-shaped armature element.

BACKGROUND OF THE INVENTION

An electromagnetically actuated friction coupling with an armature element of this type is shown in the not previously published document DE 199 51 630. This coupling comprises a rotor element mounted so that it can rotate, a fixed magnet body with a magnet coil, and a rotatable pot-like armature element which, however, is mounted so that it can be displaced axially. The armature element has a ring disc shaped area and a cylindrical jacket shaped area. With its cylindrical jacket shaped area the armature element projects into an annular groove of the magnet body in such manner that magnetic flux can be transferred via a narrow, radial air gap. Electromagnetically actuated couplings of this structural form can be manufactured inexpensively, take up little structural space, and are very reliable. A coupling of this type is suitable in hand-operated percussion drilling machines, for the coupling or release, as desired, of the drive motor from the drilling tool on the drive output side. The coupling reacts to high loads and/or deflection movements of the housing of the percussion drilling machine, such as those that occur when the drilling tool gets stuck. In this way, risk of injury to the machine operator can be avoided. The coupling described in DE 199 51 630 is designed such that when fitted in a percussion drilling machine, the rotor element is in permanent drive connection with the drive motor and the armature element is in permanent drive connection with the drilling tool or the drilling tool holder.

It has been shown that owing to the gear ratios on the drive output side, when the coupling has been released and until the elements on the drive output side have come to a complete stop, undesired reaction torques can still act upon the housing of the percussion drilling machine.

A further problem is that when the coupling has been released, although the drive output side with the drilling tool comes to rest almost at once, the drive input side of the coupling and the drive motor still continue running for a few seconds even after the current supply to the drive motor has been cut off, because of the stored rotation impulse. The machine is not ready for use again until the drive motor has come to rest. Since as a rule it is desired to resume work with the drilling tool quickly after a coupling release process, this time taken for the drive input side to come to rest is perceived as unacceptably long.

SUMMARY OF THE INVENTION

The purpose of the present invention is therefore to reduce to a minimum the undesired reaction torques that can still occur after the coupling has been released. The coupling should also be developed further in such manner that the time taken for the drive input side to come to rest after a coupling release process, is made shorter.

These objectives are achieved by an electromagnetically actuated, single-surface friction coupling without a rotor slip-ring, having the characteristics of the principal claim. According to this, the rotor element is arranged on the drive output side and the armature element on the drive input side. By virtue of its pot-like shape, associated with its cylindrical jacket surface the armature element has a considerable fraction of its total mass a large distance away from the centre of rotation, and it therefore has a large moment of inertia. In contrast, the rotor element has a smaller diameter and a smaller proportion of its mass far removed from the centre of rotation. Its moment of inertia is therefore very much lower, so that the rotation impulse that has to be dissipated on the drive output side once the coupling has been released, is very much smaller. 'Snatching' of a hand-operated tool after the coupling release process is accordingly reduced to a minimum.

In an advantageous embodiment of the invention, the friction surface of the rotor element is associated with the side of the ring disc area of the armature element opposite the cylindrical jacket shaped area of the armature element. In the engaged condition of the coupling the friction surface of the rotor element is in contact, so to speak, outside of the pot-shaped armature on the bottom of the pot, such that the rotor element is located substantially outside the axial structural space occupied by the armature element. Accordingly, the rotor element is very close to the drive output side, which enables a short shaft with correspondingly low moment of inertia to be used on the drive output side.

Corresponding to the larger moment of inertia on the drive input side of the coupling, after a coupling release process a higher rotation impulse remains in the system on the drive input side. To shorten the time taken for the drive input side to come to rest after a coupling release process, in an advantageous embodiment of the invention the armature element can move axially between two end positions, in the first of which it is frictionally engaged with the rotor element while in the second end position it is in frictional contact with a fixed braking ring.

This embodiment can advantageously be developed further in that the armature element is or can be connected to an armature shaft by means of an axially deflectable spring element, such that the armature element is pre-stressed against the braking ring by the spring element. In the absence of current supply, as after a release of the coupling, this simply constructed brake is actuated by the pre-stressing force of the spring element. Particularly in combination with an embodiment in which the friction surface of the rotor element is associated with the side of the ring disc shaped area of the armature element opposite the cylindrical jacket shaped area of the armature element, a coupling-brake combination is provided by exceptionally simple means. The armature element then has a friction surface at each of its two axial ends. One friction surface is arranged on the ring disc shaped area of the armature, so to speak on the bottom of the pot opposite the rotor element, and one friction surface is arranged on the end of the cylindrical jacket shaped area opposite the braking ring. The friction surfaces of the rotor element and of the braking ring form axial abutments between which the armature element can move to and fro.

A design of the coupling which is favorable in terms of structural space is characterized in that a flange is provided on the armature shaft for connection to the spring element, which supports the armature element and which conducts a magnetic flux between the magnet body and the rotor element when current is flowing through the magnet coil. If a first part of the flange extends with a narrow radial air gap axially along an inner jacket surface of the magnet body and a second part of the flange surrounds a hub of the rotor element with a narrow radial air gap, the magnetic flux can be transferred with little loss, respectively across the narrow radial air gaps between the components rotating at different speeds. Besides the function of mechanically coupling the armature element to the armature shaft on the drive input side, the flange also fulfils the function of coupling the rotor element magnetically with the magnet body.

The electromagnetically actuated coupling according to the invention and its embodiments are suitable for coupling or releasing a drive motor and a drilling or percussion drilling tool in a hand-operated drilling or percussion drilling machine, as desired, thanks to their small moment of inertia on the drive output side, their compact structural form and their low manufacturing cost.

BRIEF DESCRIPTION OF THE DRAWING

The invention will now be described, by way of example, with reference to the accompanying drawings in which:

The only FIGURE shows a rotor element arranged on a rotor shaft.

DETAILED DESCRIPTION OF THE INVENTION

Figure 1:
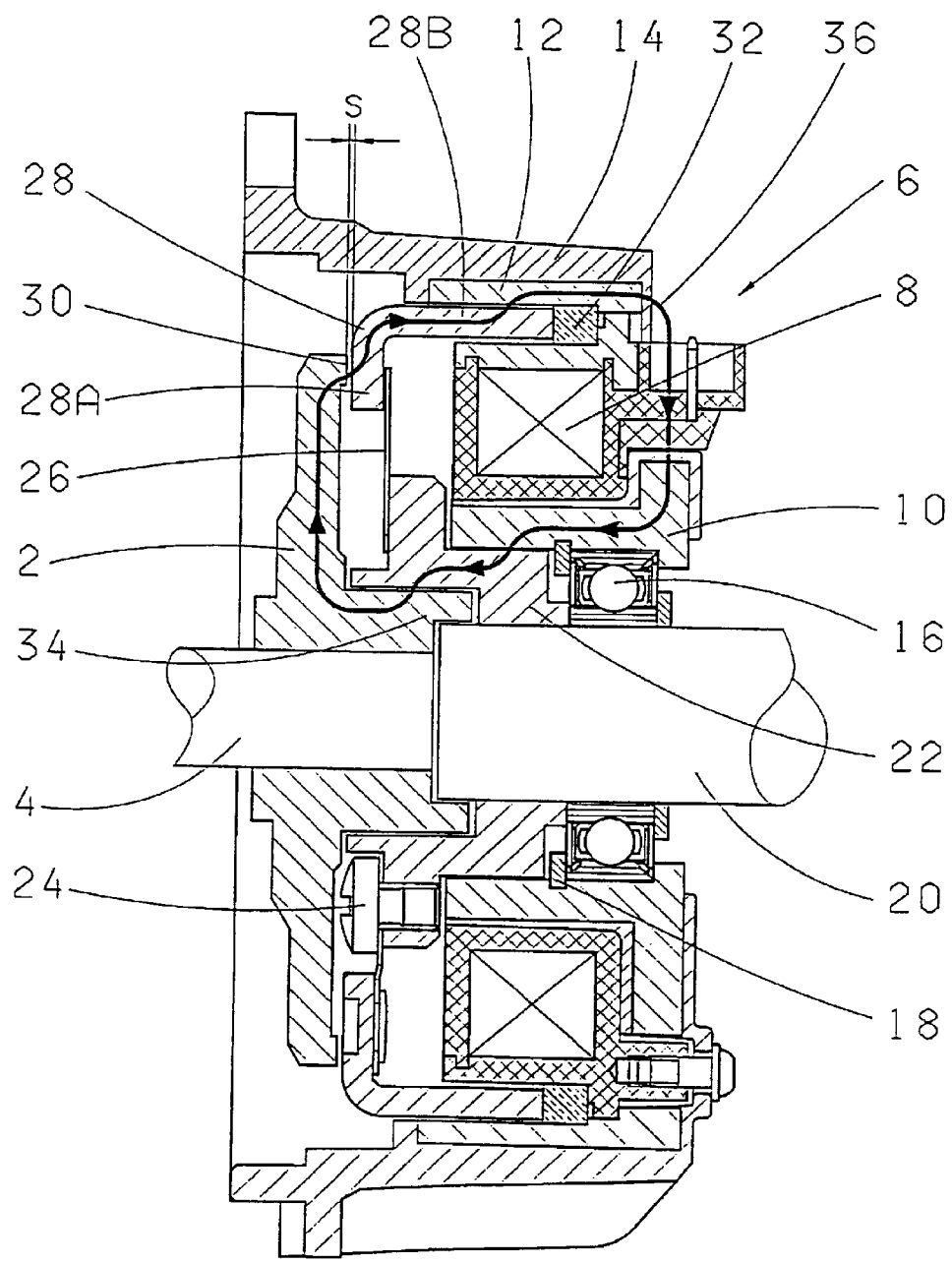

In the only FIGURE shown, a rotor element 2 is arranged on a rotor shaft 4. The rotor shaft 4 is mounted and able to rotate by virtue of bearings (not shown). A fixed magnet body 6 is provided with a magnet coil 8, said coil being arranged between an inner jacket surface 10 and an outer jacket surface 12 of the magnet body. The magnet body 6 is arranged in a fixed position in the housing 14 of the coupling, so that current can be supplied to the magnet coil 8 without the use of slip-rings. A ball-bearing 16 is held, in the inner jacket 10 of the magnet body 6, by a retaining ring 18 seated on an armature shaft 20 on the drive input side. An axially springy but rotationally rigid spring element 26 is attached to a flange 22, rotationally fixed with respect to the armature shaft 20, by means of fixing screws 24. A possible design of the spring element is described in the aforementioned DE 199 51 630. It is to be understood that the content of that earlier application is incorporated into the disclosure content of the present application.

The spring element 26 supports the armature element 28, which is therefore connected with the flange 22 in a rotationally rigid way but which can be displaced axially relative to the flange. The armature element 28 is pot shaped with a ring disc shaped area 28A and a cylindrical jacket shaped area 28B. Between the cylindrical jacket shaped area 28B of the armature element and the outer jacket surface 12 of the magnet body 6 there is a narrow radial air gap, across which a magnetic flux can be transferred from the armature element to the magnet body or vice-versa. Between the ring disc shaped area 28A of the armature element and an axially opposed, ring disc shaped friction surface 30 of the rotor element 2 there is an axial, working air gap S which can be bridged. When electric current flows through the magnet coil 8, magnetic poles are formed in the area of the working air gap S on the rotor element and on the armature element, between which there is a force of attraction. Due to this force of attraction, the armature element 28 is displaced axially towards the rotor element so that the working air gap S is bridged and the two elements come into frictional engagement with one another.

This is the switching position adopted by the coupling in a hand-operated drilling or percussion drilling machine during operation. The drilling or percussion drilling machine is then driven by a drive motor. If an overload occurs or if a deflection movement of the housing of the machine larger than a predetermined size is detected, then the tool on the drive output side of the drive motor is uncoupled from the latter, since the magnet coil 8 is, in such a case, switched off. The pre-stressing force of the spring element 26 then separates the armature element 28 from the rotor element.

The drive output side of the coupling, which is formed of the rotor element 2 and the rotor shaft 4, has only a very small moment of inertia and because of this any further displacement movement after the release of the coupling is reduced to a minimum.

The friction surface 30 of the rotor element 2, shown in FIG. 1, is associated with the side of the ring disc shaped area 28A of the armature element 28 opposite the cylindrical jacket shaped area 28B of the armature element 28. The axial movement of the armature element 28 is restricted, on one side, by the rotor element 2 and, on the other side, by a braking ring 32. The armature element 28 can move axially between two end positions, in the first of which, on the left, it is frictionally coupled with the rotor element 2 while in the second end position on the right, it is in frictional contact with the fixed braking ring 32. When there is no current in the coupling, the spring element 26 exerts an axial pre-stressing force on the armature element 28 which presses the armature element axially against the braking ring. When the coupling has been released, the armature shaft 20 with the armature element 28 and the drive motor, coupled thereto in a driving connection, is braked to rest in a short time. Accordingly, for the machine operator the waiting time until the machine is again ready for operation, after a coupling release process, is very short.

The flange 22, which provides the driving connection between the armature shaft 20 and the spring element 26 and the armature element 28, extends with a narrow radial air gap along part of the inner jacket surface 10 of the magnet body 6. A magnetic flux is transferred across this narrow radial air gap from the magnet body to the flange. In a second area of the flange, a hub 34 of the rotor element 2 is enclosed with a narrow radial air gap. A magnetic flux, represented by the line 36 and established when current flows through the magnet coil 8, therefore flows from the radially inner jacket surface 10 of the magnet body 6 across an air gap to the flange 22, from there across a narrow radial air gap to the hub 34 of the rotor element, from there across the bridged working air gap S to the pot shaped armature element 28, and from there across a narrow radial air gap to the outer jacket surface 12 of the magnet body 6.

| List of index numbers | |
|---|---|
| 2 | Rotor element |
| 4 | Rotor shaft |
| 6 | Magnet body |
| 8 | Magnet coil |
| 10 | Inner jacket surface |
| 12 | Outer jacket surface |
| 14 | Housing |
| 16 | Bearing |
| 18 | Retaining ring |
| 20 | Armature shaft |
| 22 | Flange |
| 24 | Screw |
| 26 | Spring element |
| 28 | Armature element |
| 28A | Ring disc shaped area |
| 28B | Cylindrical jacket shaped area |
| 30 | Friction surface |
| 32 | Braking ring |

| | |
|---|---|
| 34 | Hub |
| 36 | Magnetic flux |

What is claimed is:

1. An electromagnetically actuated, single-surface friction coupling without a rotor slip-ring, the friction coupling comprising:
   a rotor element (2) mounted so that the rotor element (2) can rotate;
   a fixed magnet body (6) provided with a magnet coil (8) and an armature element (28) which can rotate but is mounted so that it can be axially displaced, the armature element (28) being pot shaped with a ring disc shaped are (28A) and a cylindrical jacket shaped area (28B), such that the cylindrical jacket shaped area (28B) of the armature element extends with a narrow air gap axially along an outer jacket surface (12) of the magnet body; and
   an axial working air gap (S), between the ring disc shaped area (28A) of the armature element and an axially opposed, ring disc shaped friction surface (30) of the rotor element (2), which can be bridged, the armature element (28) being able to be displaced axially by a magnetic force and brought into frictional engagement with the rotor element (2), and the rotor element (2) is arranged on the drive output side and the armature element (28) is arranged on the drive input side.

2. The friction coupling according to claim 1, wherein the friction surface (30) of the rotor element is associated with a side of the armature element (28) corresponding to its ring disc shaped area (28A), which is opposite the cylindrical jacket shaped area (28B) of the armature element (28).

3. The friction coupling according to claim 2, wherein the armature element (28) is axially movable between two end positions, such that in a first end position the armature element (28) is coupled in frictional engagement with the rotor element (2) and in a second end position, the armature element (28) is in frictional contact with a fixed braking ring (32).

4. The friction coupling according to claim 3, wherein the armature element (28) is connected to an armature shaft (20) via an axially deflectable spring element (26) and the armature element (28) is axially pre-stressed by the spring element (26) against the braking ring (32).

5. The friction coupling according to claim 4, wherein a flange is provided on the armature shaft (20) for connection with the spring element (26), and the flange transfers magnetic flux (36) between the magnet body (6) and the rotor element when current is flowing in the magnet coil (8).

6. The friction coupling according to claim 5, wherein a first part of the flange extends with a narrow radial air gap long an inner jacket surface (10) of the magnet body (6) and a second part of the flange surrounds a hub (34) of the rotor element with a narrow radial air gap.

7. The friction coupling according to claim 1, wherein the friction coupling is incorporated within a hand-operated drilling machine.

8. The friction coupling according to claim 1, wherein the friction coupling is incorporated within a percussion drilling machine.

9. A drilling machine having an electromagnetically actuated, single-surface friction coupling without a rotor slip-ring, the friction coupling comprising:
   a rotor element (2) mounted so that the rotor element (2) an rotate;
   a fixed magnet body (6) provided with a magnet coil (8) and an armature element (28) which can rotate but is mounted so that it can be axially displaced, the armature element (28) being pot shaped with a ring disc shaped are (28A) and a cylindrical jacket shaped area (28B), such that the cylindrical jacket shaped area (288) of the armature element extends with a narrow air gap axially along a outer jacket surface (12) of the magnet body; and
   an axial working air gap (5), between the ring disc shaped area (28A) of the armature element and an axially opposed, ring disc shaped friction surface (30) of the rotor element (2), which can be bridged, the armature element (28) being able to be displaced axially by a magnetic force and brought into frictional engagement with the rotor element (2), and the rotor element (2) is arranged on the drive output side and the armature element (28) is arranged on the drive input side.

10. The drilling machine according to claim 9, wherein the drilling machine is a hand-operated drilling machine.

11. The drilling machine according to claim 9, wherein the drilling machine is a percussion drilling machine.

12. An electromagnetically actuated, single-surface friction coupling without a rotor slip-ring, the friction coupling comprising:
   a rotor element (2) mounted so that the rotor element (2) can rotate;
   a fixed magnet body (6) provided with a magnet coil (8) and an armature element (28) which can rotate but is mounted on a drive input so that it can be axially displaced relative to the drive input and the drive output, the armature element (28) being pot shaped with a ring disc shaped area (28A) and a cylindrical jacket shaped area (28B), such that the cylindrical jacket shaped area (28B) of the armature element extends with a narrow air gap axially along an outer jacket surface (12) of the magnet body; and an axial working air gap (5), between the ring disc shape area (28A) of the armature element and an axially opposed, ring disc shaped friction surface (30) of the rotor element (2), which can be bridged, the armature element (28) being able to be displaced axially by a magnetic force and brought into frictional engagement with the rotor element (2), and the rotor element (2) is arranged on a drive output and the armature element (28) is arranged on the drive input.

* * * * *